Dec. 29, 1959     P. H. HUGHES     2,919,141
PORTABLE AUTOMOBILE FENDER COVER
Filed Oct. 3, 1958     2 Sheets-Sheet 1
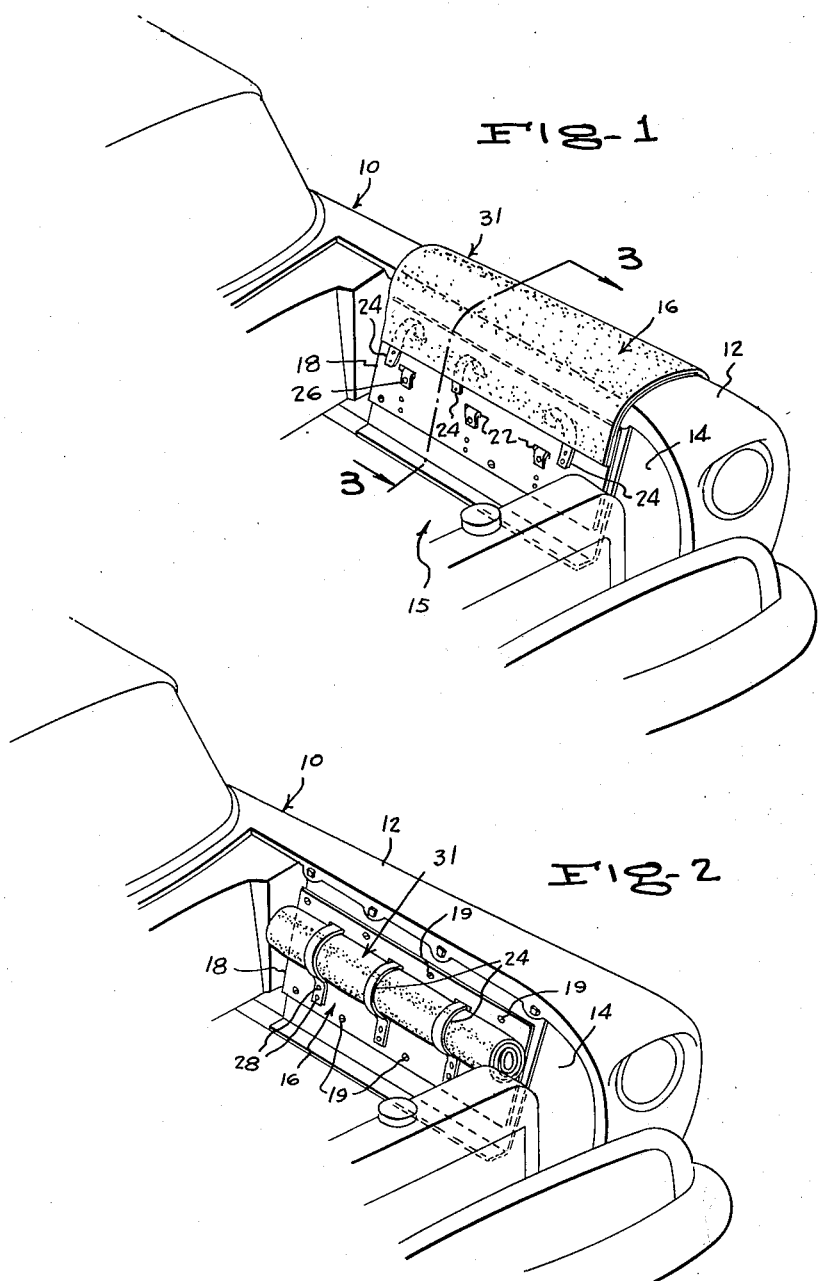
INVENTOR.
PATRICK H. HUGHES
BY
McMorrow, German + Davidson
ATTORNEYS

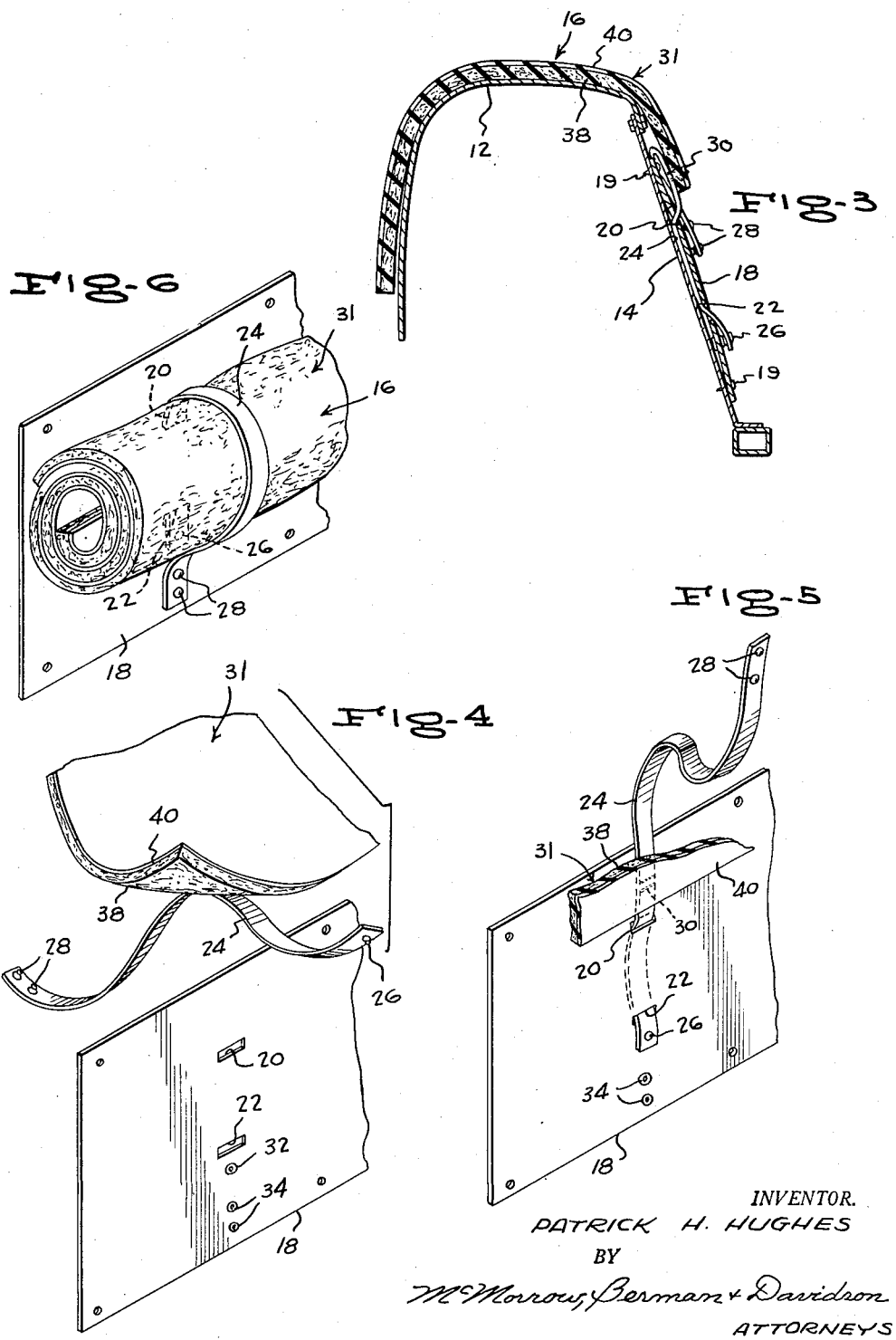

United States Patent Office 2,919,141
Patented Dec. 29, 1959

2,919,141

PORTABLE AUTOMOBILE FENDER COVER

Patrick Henry Hughes, Lincoln, Nebr.

Application October 3, 1958, Serial No. 765,125

1 Claim. (Cl. 280—150)

This invention relates to fender covers for automobiles and similar vehicles. More particularly, the invention has reference to a fender cover which is particularly designed to be used as an accessory for a vehicle, mounted thereupon in a position such as to be readily available whenever a protective covering for the fenders of the vehicle is desired.

Most usually, fender covers employed in garages, service stations and the like for the purpose of preventing soiling or scratching of the automobile fenders, are merely pieces of a soft fabric, such as flannel or the like. The difficulty with an arrangement of this type is that the fender cover tends to shift, slide, and move back and forth upon the fender, rendering the same inconvenient to use. Often, during the performance of maintenance operations upon a vehicle engine, or during the making of necessary repairs upon the engine or upon adjacent components of the vehicle, the mechanic finds that the cover has slipped from position, so that an annoying inconvenience and loss of time results.

Further, although fender covers of the character described are in common use in garages or service stations, the ordinary vehicle owner finds, whenever he desires to perform certain maintenance operations on the vehicle without taking the same to a garage or service station, that a suitable covering for protecting the fenders is not available.

In view of the above, it is proposed to provide a protective covering for automobile fenders or the like, which will be so designed as to be an accessory or piece of added equipment, on a particular vehicle, so located within the vehicle as to be at all times immediately available for use as a fender cover.

Another object is to so design the fender cover as to permit the same to be compactly rolled when not in use, in a position at one side of the vehicle engine within the engine compartment, thus to be completely out of the way and concealed when not in actual use.

Another object is to provide a fender cover of the character stated which will, whenever it is to be put in use, be capable of being swiftly unrolled into an operative, fender-overlying position.

Still another object of importance is to provide a fender cover of the character stated which will include, in a desirable, coactive relationship, a backing plate capable of being readily attached to the side wall of the engine compartment below the fender; a flexible cover member adapted to be carried by said plate and also adapted to be swiftly unrolled to a fender-protecting position; and a plurality of straps, detachably connectible to the plate and so arranged relative to the plate as to not only connect the fender cover member to the plate, but also hold the cover member in a rolled position against the plate when not in use.

Another object is to provide a device of the character stated which will not interfere with normal operation of the vehicle, and furthermore will not interfere with the conventional placement of wiring or other vehicle components.

Another object is to provide a fender cover of the character stated which can be so designed as to be either incorporated in the vehicle at the time the vehicle is manufactured, or alternatively, sold as a separate accessory or piece of added equipment, in the same manner as a large number of other accessories are sold by automobile dealers, automobile accessory stores, and related establishments.

Another object is to provide a device of the character stated which will be capable of manufacture at a comparatively low cost, considering the benefits to be obtained from the use thereof.

Another object is to provide a cover of the character described that will include a cover member comprising a relatively thick layer of soft rubber, in face-to-face contact with a thinner, flexible member which would also be of soft rubber, but which, as distinguished from the thicker layer, will be impervious to water, the thicker member being of some such material as spronge rubber or the like.

Another object is to provide a device of the character stated which will be usable on any of various makes or models of vehicles, without requiring any change in the size or design of the device.

Other objects will appear from the following description, the claim appended thereto, and from the annexed drawings, in which like reference characters designate like parts throughout the several views, and wherein:

Figure 1 is a fragmentary perspective view of a vehicle with the hood removed, showing the device mounted in the vehicle in a position ready for the performance of necessary maintenance or repair operations upon the vehicle;

Figure 2 is a view similar to Figure 1 in which the device has been rolled up into an inoperative position wholly recessed within the engine compartment of the vehicle;

Figure 3 is an enlarged, transverse sectional view substantially on line 3—3 of Figure 1;

Figure 4 is an enlarged, fragmentary, partially exploded perspective view showing the relative formation and connecting means of the main components of the device;

Figure 5 is a fragmentary perspective view on substantially the same scale as Figure 4, showing the components in their connected relationship; and, Figure 6 is a fragmentary perspective view on the same scale as Figures 4 and 5, with the device rolled up in inoperative position.

Referring to the drawing in detail, generally designated at 10 is a conventional automobile or similar vehicle, having a fender 12 secured (see Figure 3) to the side wall 14 of the engine compartment 15 of the vehicle. In different makes or models of vehicles, the relative form and arrangement of the fender 12 and side wall 14 might be varied somewhat. Nevertheless, in most cases the side wall will extend in an inclined position as shown in Figure 3, and will be bolted or otherwise fixedly secured at its top edge to the inner edge of a fender 12 having a cross-sectional shape generally similar to that shown in Figure 3.

Generally designated at 16 is the fender protector comprising the present invention, and as shown in Figure 4, this includes a flat mounting plate 18. In a preferred embodiment, the mounting plate would be a sheet of aluminum. However, hereinafter dimensions or materials will not be specified except by way of providing general information as to the types and characteristics of materials found to be capable of being advantageously employed in the protector. Obviously, as long as the materials retain certain basic characteristics and relative proportions, the manufacturer may desire to vary the particular materials and dimensions.

In any event, the support plate 18 in the illustrated embodiment is secured by screws 19 along its top and bottom edge, to the inner surface of the side wall 14. Of course, if the vehicle has any wiring extending along the side wall 14, said wiring may advantageously be directed through the space between the plate 18 and the side wall 14. In such an event, one can perform necessary maintenance or repair operations on the wiring merely by removal of the screws 19. This would permit removal of the plate 18, to provide access to the wiring.

Designated at 20 is a row of upper slots formed in the plate, said row being parallel to and in closely spaced relation to the top edge of the plate 18.

A row of lower slots 22 is also provided, this row being parallel to the upper slots, with the rows having corresponding, transversely aligned slots as shown to particular advantage in Figure 5.

Designated at 24 are straps, and in the illustrated example, but not necessarily, three of these are employed. Straps 24 are spaced longitudinally of and extend transversely of plate 18, as will be seen in Figure 2.

Connected to one end of each strap 24 is a male gripper fastener element 26. Male gripper fastener elements 28 are provided upon the other end of the strap 24. There are two of the elements 28 as will be seen in Figure 5, in a preferred embodiment of the invention.

Each strap 24 is stitched as at 30, intermediate the ends of the strap, to the inner longitudinal edge portion of a rectangular, flexible cover member generally designated 31.

Referring to Figure 4, mounted fixedly in the plate 18, in line with each pair of transversely aligned slots 20, 22, are female gripper fastener elements 32, 34. As will be seen from Figure 4, there is one element 32 in close proximity to each slot 22. There is a pair of elements 34, adjacent and below each element 32. Thus, at intervals along the length of the plate 18, there are provided the following, in transversely aligned relation: a slot 22, a slot 20, a fastener element 32, and a pair of fastener elements 34.

The cover member 31 has a particular construction, which is especially desirable in insuring to the maximum extent that the fender will be properly protected, while at the same time providing for maximum life and durability in the cover member. As will be noted from Figures 3 and 4, the cover member 31 comprises a pair of laminations, which would be adhesively or otherwise secured together over their full area. These include a bottom lamination 38, which is comparatively thick, and which is formed of sponge rubber or the like. A top lamination 40 has its periphery in full registration with that of the bottom lamination, and is formed of soft rubber, of a type that is possessed of considerable strength, and that will be fully waterproof so as to be impervious to the elements.

Preferably, a type of rubber that is resistant to corrosive effects of oil, or of other lubricants or liquids found in service stations and garages, is employed for the upper layer 40.

The stitching 30 is extended through both laminations as shown in Figure 3, providing a secure connection of the straps to the cover member.

As will be noted, each strap is threaded through transversely aligned slots 20, 22, with the strap extending in back of the plate between the slots. One end of the strap, this being the end having the fastener element 26, is secured to the fastener element 32 of the plate.

When the device is not in use, the pad may be rolled up from its Figure 3 position to its Figure 6 position. Thereafter, the free end of the strap, having the elements 28, is extended about the rolled cover member as shown in Figure 6, and the elements 28 are connected to the elements 34 of the plate 18. This is also shown in Figure 2. Whenever the pad is to be placed in use, the elements 28 are disconnected from the elements 34, and this frees the cover member for unrolling to its operative position shown in Figure 1, protectively overlying the fender. The free ends of the straps are extended downwardly between the inner edge portion of the member 31 and the plate 18, in the circumstances clearly shown in Figure 3.

The device when not in use is fully concealed within the engine compartment and does not of course in any way interfere with the normal operation of the regular components of the vehicle. At all times, however, the device is immediately available for use, and is swiftly adjusted to its operative position shown in Figure 1.

Furthermore, the device can be manufactured at low cost, can be attached to any of a large number of makes or models of vehicles, and can be sold as a separate accessory, readily installed in a vehicle.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any change in construction that may be permitted within the scope of the appended claim.

What is claimed is:

In a fender protector, the combination with the fender of a vehicle and with a vehicle side wall adjacent said fender, of a mounting plate attached to said side wall; a plurality of straps connected to said mounting plate; and a flexible protector member connected to the several straps and adapted to be rolled into an inoperative position in which it is supported by the mounting plate in engagement therewith, said member being disposed in protectively overlying relation to the top of the fender when unrolled from said inoperative position, said straps being adapted for retaining the protector member in its rolled position, said straps being extended transversely of the mounting plate, said mounting plate having pairs of transversely aligned slots, each strap being threaded through the slots of a pair, each strap having fastener elements at opposite ends thereof, the plate having a plurality of fastener elements adapted to be connected to the fastener elements of a strap, thus to provide a detachable connection at both ends of a strap to said plate.

References Cited in the file of this patent

UNITED STATES PATENTS

| | | |
|---|---|---|
| 2,460,394 | Peatross | Feb. 1, 1949 |
| 2,771,319 | Renquist | Nov. 20, 1956 |
| 2,797,932 | Ambrose | July 2, 1957 |
| 2,802,524 | Peacock | Aug. 13, 1957 |